Aug. 25, 1970  C. ORR, JR  3,525,255
METHOD AND APPARATUS FOR MEASURING ANGLE OF CONTACT
BETWEEN LIQUIDS AND SOLIDS
Filed Feb. 25, 1969  2 Sheets-Sheet 1
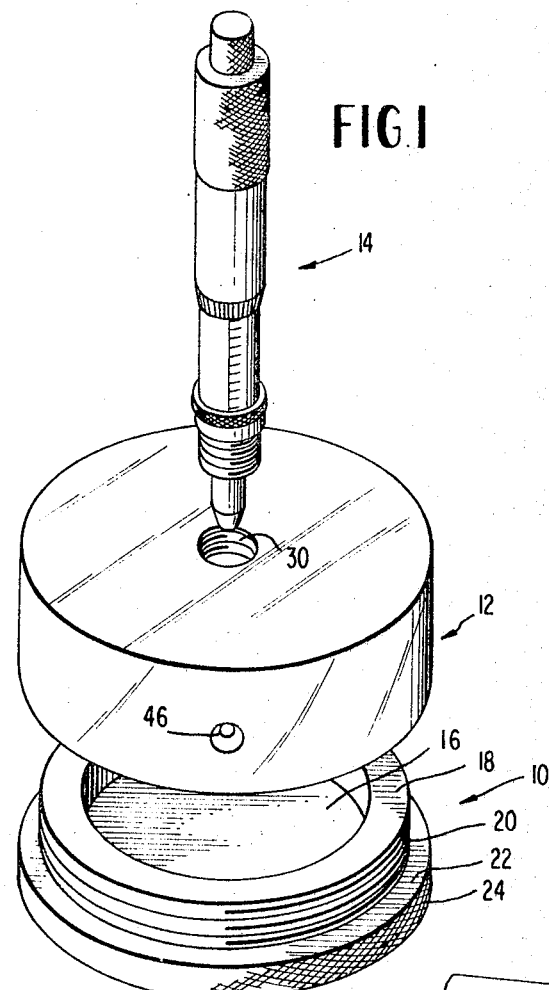
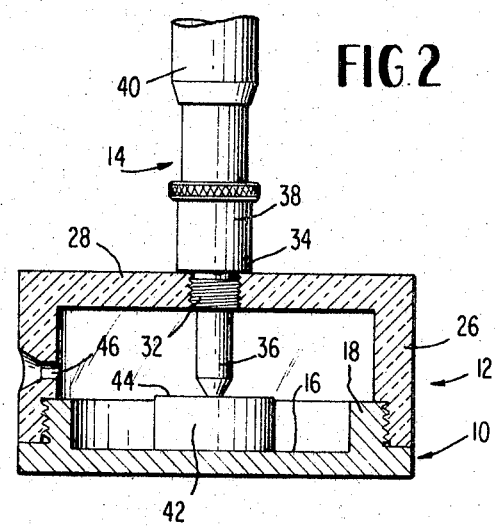
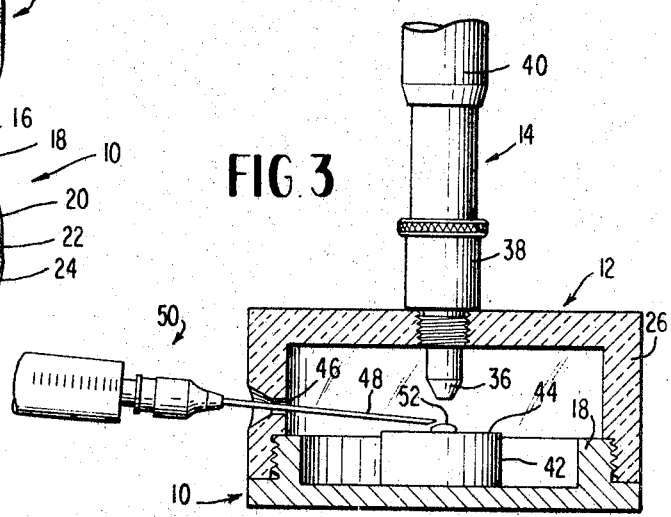
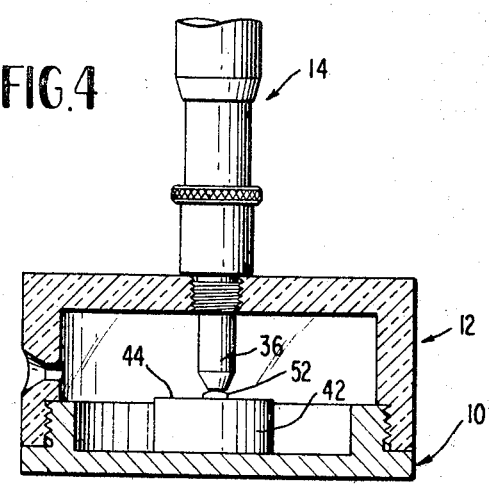
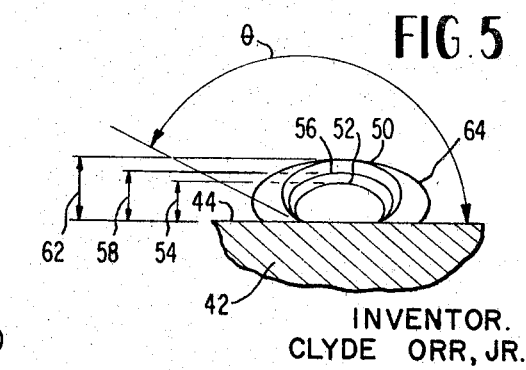
INVENTOR.
CLYDE ORR, JR.
BY: *Newton, Hopkins & Ormsby*
ATTORNEYS Aug. 25, 1970  C. ORR, JR  3,525,255
METHOD AND APPARATUS FOR MEASURING ANGLE OF CONTACT
BETWEEN LIQUIDS AND SOLIDS
Filed Feb. 25, 1969  2 Sheets-Sheet 2

INVENTOR.
CLYDE ORR, JR.

BY: *Newton, Hopkins & Ormsby*

ATTORNEYS

United States Patent Office 3,525,255
Patented Aug. 25, 1970

3,525,255
METHOD AND APPARATUS FOR MEASURING ANGLE OF CONTACT BETWEEN LIQUIDS AND SOLIDS
Clyde Orr, Jr., Atlanta, Ga., assignor to Georgia Tech Research Institute, Atlanta, Ga., a corporation of Georgia
Filed Feb. 25, 1969, Ser. No. 801,936
Int. Cl. G01n 13/02
U.S. Cl. 73—64.4               13 Claims

ABSTRACT OF THE DISCLOSURE

The contact angle between a liquid and a body of solid material, which body may be a solid or a mass of compacted particulate solid material, is determined by establishing a reference plane at the surface of the body, depositing a globule of the liquid on the surface, measuring the height of the globule above the reference plane, and then alternately adding more liquid to the globule and measuring the globule height until a maximum globule height is noted. This maximum height is then used to calculate the contact angle.

BACKGROUND OF THE INVENTION

The molecules of a liquid may exhibit either a greater or a lesser attraction for one another than they do for a solid with the result that a liquid in contact with a solid exhibits a characteristic angle at the zone of contact that is indicative of the degree of attraction. This angle is known as the contact angle and by definition it is the angle between the tangent to the liquid interface at the point of contact between the liquid and the solid surface measured so that the liquid is included within the angle. Contact angles vary from very near zero degrees to approximately 150°.

Traditionally, contact angles have been measured by the captive-bubble method in which the solid, which must have a clean, flat surface, is placed on the bottom of a glass cell containing the liquid and an air bubble is introduced at the end of a tube and pressed down on the surface and an image of the bubble is projected onto a screen. The angle of contact between the bubble and the surface is then measured from the projection. There are certain disadvantages to this method, namely, the liquid must be transparent and it may not be used to measure contact angles between a liquid and a body of solid material wherein the body of solid material is a powder. Moreover, the contact angle should be measured at the point of contact, but with the captive bubble method it is in actuality measured from a point a short distance away from such contact point.

BRIEF SUMMARY OF THE INVENTION

The above disadvantages are overcome by the present invention by providing apparatus and utilizing a method which determines the maximum height which a globule of the liquid may attain, without spreading, upon the surface of a body of material. The body may be a solid or it may be a compacted mass of particulate solid material and, in either case, the surface of the body is utilized, by lowering a measuring instrument into contact with such surface, to establish a reference plane. A small drop or globule of the liquid is then deposited on the surface of the body, the measuring instrument is again lowered to measure the height of the drop or globule above the reference plane, more liquid is added to the globule and the height is again measured. This process is repeated until the maximum height which the globule may attain, without spreading, is determined.

The apparatus includes a base plate member upon which the body is supported, and a spacer having a portion supporting the measuring instrument and being provided with an opening in the side wall thereof for the introduction therethrough of the needle of a syringe for initially depositing and later adding liquid. Also, the apparatus includes a plunger guide and plunger assembly for compacting a mass of particulate solid material onto the base plate. It is a particular feature of the invention that the plunger be provided with an annular projection which forms an annular trench or depression in the surface of the compacted powder or particulate solid material which serves to anchor the globule thereon.

BRIEF DESCRIPTION OF THE DRAWING FIGURES

FIG. 1 is an exploded perspective view showing the base plate, spacer and measuring instrument;

FIG. 2 is a vertical section taken through the assembly of FIG. 1 in assembled relation;

FIG. 3 is a view similar to FIG. 2 but showing a later stage in the measuring technique;

FIG. 4 is a view similar to FIGS. 2 and 3 but showing the measurement of globule height;

FIG. 5 is an enlarged view showing, diagrammatically, the relationship of globule height and the contact angle;

DETAILED DECRIPTION OF THE INVENTION

Figure 6:
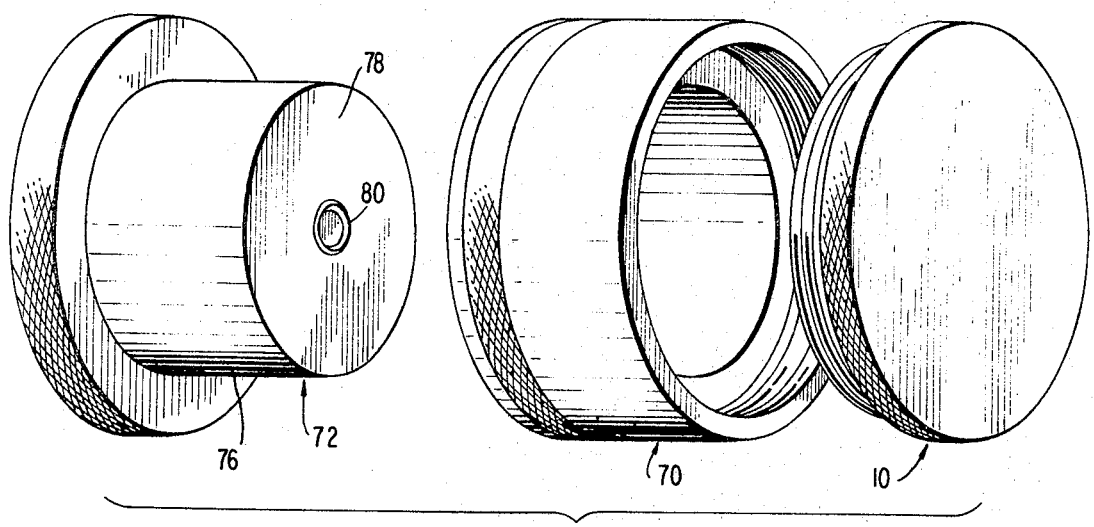
FIG. 6 is an enlarged exploded perspective view showing the base plate, plunger guide and plunger for use in conjunction with particulate solid materials.

With reference at this time more particularly to FIG. 1, the apparatus according to the present invention will be seen to include the base plate indicated generally by the reference character 10, the spacer indicated generally by the reference character 12 and the measuring instrument indicated generally by the reference character 14. The base plate includes a flat upper surface 16 for supporting the body of solid material under investigation, and this surface is surrounded by an upstanding annulus 18 having a threaded outer surface 20, the lower extremity of the base plate being enlarged as indicated to present the stop shoulder or face 22 which may be externally knurled as indicated by the reference character 24 for ease of manipulation of the assembly as will hereinafter more particularly appear.

As may be seen in FIG. 2, the upstanding side wall portion 26 of the spacer 12 is internally threaded and is removably received on the annulus 18 of the base plate and is screwed down into engagement with the stop face 22. The top wall 28 of the spacer is provided with a threaded opening 30 into which the threaded shank 32 of the measuring instrument 14 is engaged and the enlarged portion 34 of the measuring instrument is seated against the upper face of the wall 28, substantially as is shown. Conveniently, the measuring instrument may take the form of a micrometer having the usual spindle 36, sleeve 38 and thimble 40, the spindle 36 being adapted for axial extension and retraction as is well known. Prior to assembling the spacer and measuring instrument to the base plate 10, the sample of material 42 is supported on the surface 16 of the base plate and this sample is formed such as to present a flat upper surface 44 for the purpose of making the requisite contact angle measurement. The spacer and measuring instrument are then assembled as shown in FIG. 2 and the entire assemblage is supported in such fashion that the upper surface 44 of the material under test is horizontal or level. The spindle 36 of the measuring instrument is then extended into contact with the surface 44 and the micrometer reading noted to establish a reference plane, whereafter the spindle is withdrawn. It will be noted that the side wall 26 of the spacer is provided with an opening 46 at a level somewhat above the level of the annulus 18 of the base plate for the reception of the hollow needle portion 48 of a syringe assembly indicated generally by the reference character 50, see particularly FIG. 3. By this means, a small drop or globule 52 of the liquid is placed on the surface 44, the spacer being constructed of material such that its side wall 26 is transparent so that the globule 52 is easily observed and it further being appreciated that the globule is placed approximately beneath the spindle 36 of the measuring instrument 14. The spindle 36 of the measuring instrument 14 is then lowered into contact with the top of the globule 52 as is shown in FIG. 4. In the case of liquids which wet the steel surface of the spindle 36, the contact between the lower end of the spindle 36 and the globule of liquid 52 may easily be observed by noting that the liquid surface will jump or quiver as soon as contact is made. If the liquid does not wet the material of the spindle 36, the initial contact position may be ascertained by placing a light on the opposite side of the plunger 36 from the observer with all three; i.e., the light, the contact point and the observer in the same horizontal plane.

In all likelihood, as may be seen in FIG. 5, the initial globule 52 will not exhibit a height, as indicated at 54, as projects as far above the surface 44 as will the liquid after several additions to the droplet 52. Thus, after the initial height 54 is established, the needle 48 of the syringe 50 is reinserted through the opening 46 in the spacer side wall 26 and into the droplet 52 and a small additional quantity of liquid added to produce the enlarged globule as indicated by the reference character 56 in FIG. 5. The height 58 of this enlarged globule is measured, additional liquid is added to produce a further enlarged globule 60 and its height 62 measured and this alternate addition and measurement is continued until a maximum height reading is obtained. Continued additions with the syringe will produce spreading and no further increase in height as is indicated by the spread globule 64 in FIG. 5 wherein, due to spreading, it will be obvious that the height will be equal to the maximum height 62 indicated in that figure.

It may be shown that the greater height $h$ that the globule of liquid may attain is related to the contact angle $\theta$ according to the following relationship:

$$\cos\theta = 1 - h\sqrt{\frac{2}{2B}}$$

where $\theta$ is less than 90° and $$\cos\theta = -1 + \sqrt{\frac{4 - 2h^2 B}{3}}$$

where $\theta$ is greater than 90°.

In the above relationships, $B = \rho g / 2\gamma$, where $\rho$ is the liquid density; $g$ is the acceleration due to gravity; and $\gamma$ is the free surface energy of the liquid [commonly called the surface tension or interfaciel tension].

When the body of solid material is a compacted mass of particulate solid material, the relationships are as follows:

$$\cos\theta = 1 - h\sqrt{\frac{2}{3(1-\epsilon)B}}$$

when $\theta$ is less than 90°; and $$\cos\theta = -1 + \sqrt{\frac{4 - 2h^2 B}{3(1-\epsilon)B}}$$

when $\theta$ is greater than 90°, where; $\epsilon$ is the porosity of the compacted mass, $B = \rho g / 2\gamma$, where $\rho$ is the liquid density; $g$ is the acceleration due to gravity; and $\gamma$ is the free surface energy of the liquid; and $h$ is the maximum height of the liquid globule.

Specifically, the value of $\epsilon$ may be calculated from the following:

$$\epsilon = \frac{\text{overall volume} - \text{actual volume}}{\text{overall volume}} = \frac{(d^2 \pi t)/4 - /\rho}{(d^2 \pi t)/4}$$

where $d$ is the cake diameter, $t$ is the cake thickness, $w$ is the weight of the powder composing the cake, and $\rho$ is the absolute density of the powder. Obviously, the measuring instrument may conveniently be utilized to measure the thickness of the compacted mass of powder.

Figure 7:
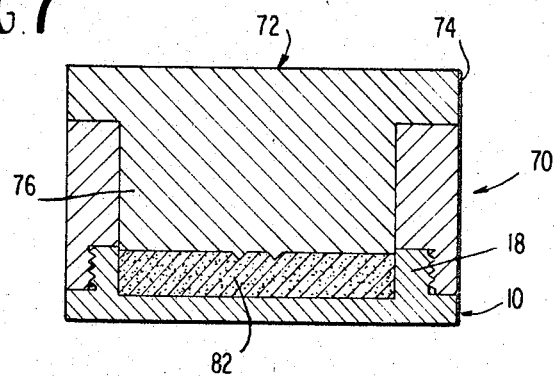
FIG. 7 is a view illustrating the formation of the compacted mass of particulate solid material.

The apparatus for forming the compacted mass of solid material is shown in FIGS. 6 and 7 and will be seen to consist of a plunger guide 70 adapted to be secured to the base plate 10 in the fashion indicated in FIG. 7, and a plunger assembly indicated generally by the reference character 72. The plunger 72 may be provided with a knurled head portion 74 and a plunger body 76 having a flat end face 78 provided with an annular projection 80 which conveniently may be V-shaped configuration in cross section as is shown in FIG. 7. The powder is introduced in the plunger guide 70 after the same has been secured to the base plate 10 and the plunger is utilized to compact the powder as indicated by the reference character 82 in FIG. 7, the top of the compacted cake or mass 82 to be positioned approximately at the upper level of the annular wall portion 18 of the base plate 10, or slightly therebelow.

Figure 8:
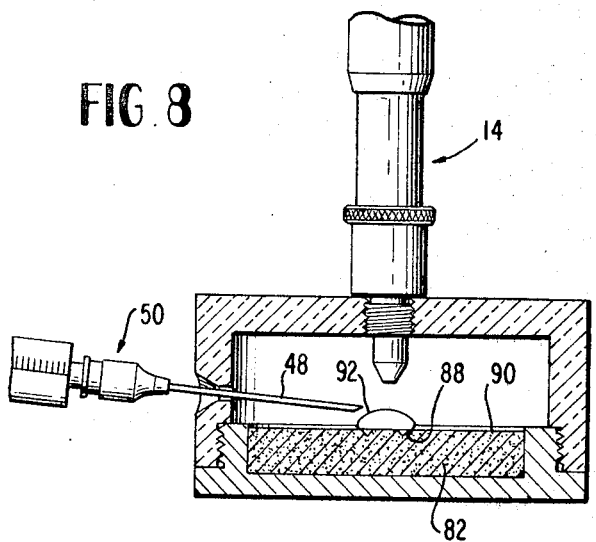
FIG. 8 is a vertical section illustrating certain techniques associated with the measurement of contact angle between a liquid and the compacted mass of particulate solid material.

As may be seen in FIG. 8, the ring like projection 80 on the end face 78 of the plunger assembly 72 forms an annular, V-shaped depression 88 in the surface 90 of the compacted mass 82, this depression 88 serving to form an anchoring trench or trough to prevent the globule 92 from rolling when touched by the needle 48 of the syringe 50. Thus, the globule 92 should be of initial dimensions to extend beyond the outer confines of the trench or trough 88, substantially as is shown. The measurement technique is identical to that previously described in conjunction with the body 42 and the contact angle is calculated from the appropriate relationships as set forth hereinabove.

The extent of the compression by the plunger assembly 72 to effect the cake 82 depends primarily on the nature of the powdered material itself. Obviously, the particles should not be crushed or distorted unnecessarily, but a smooth, firm upper surface 90 should be created, it being noted that most accurate results are achieved when the cake has a minimum porosity. Therefore, the compression should be as great as feasible without unnecessarily crushing or distorting the particles of the powder.

When the liquid under test tends to wet the powder material, the surface 90 of the powder may be lightly wetted with the liquid prior to the deposition of the initial globule 92.

As examples of actual data, the following is offered:

Mercury on powdered Bakelite at 25° C.

$$B = \frac{13.53 \times 979.5}{2 \times 473} = 14.0$$

$$\epsilon = \frac{[5.080^2 \times 3.1416 \times 0.645]/4 - 13.06/1.37}{[5.080^2 \times 3.1416 \times 0.645]/4} = 0.272$$

$h$ [above cake as mercury added]

| | |
|---|---|
| 0.341 cm. | 0.367 cm. |
| 0.348 | 0.368 |
| 0.361 | 0.369 maximum |
| 0.366 | 0.369 |

$$\cos\theta = -1 + \sqrt{\frac{4 - 2(0.369)^2 \times 14.0}{3(1 - 0.272)}} = -0.648$$

$\theta = 130°$

Mercury on fused Bakelite at 25° C.

$$B=14.0$$

$h$ [above solid as mercury added]

| | |
|---|---|
| 0.300 cm. | 0.363 cm. maximum |
| 0.343 | 0.362 |
| 0.347 | |

$$\cos\theta = -1 + \sqrt{\frac{4-2(0.363)^2 \times 14.0}{3}} = -0.679$$

$$\theta = 133°$$

Water on stainless steel at 25° C.

$$B = \frac{0.9971 \times 979.5}{2 \times 71.97} = 6.79$$

$h$ [above solid as water added]

| | |
|---|---|
| 0.094 cm. | 0.141 cm. |
| 0.127 | 0.147 maximum |
| 0.130 | 0.146 |
| 0.134 | 0.147 |

$$\cos\theta = 1 - 0.147\sqrt{\frac{2}{3 \times 6.79}} = 0.954$$

$$\theta = 17.5°$$

Water on polytetrafluoroethylene [Teflon] at 25° C.

$$B = 6.79$$

$h$ [above solid as water added]

| | |
|---|---|
| 0.371 cm. | 0.412 cm. |
| 0.367 | 0.414 maximum |
| 0.381 | 0.414 |
| 0.405 | 0.413 |

$$\cos\theta = -1 + \sqrt{\frac{4-2(0.414)^2 + 6.79}{3}} = -0.258$$

$$\theta = 105°$$

Heptane on titanium dioxide at 20° C.

$$B = \frac{0.6838 \times 979.5}{2 \times 20.35} = 16.46$$

$h$ [above surface as heptane added]

| | |
|---|---|
| 0.016 cm. | 0.021 cm. |
| 0.018 | 0.025 maximum |
| 0.019 | 0.025 |

$$\epsilon = 0.444$$

$$\epsilon = 0.444$$

$$\cos\theta = 1 - 0.025\sqrt{\frac{2}{3(1-0.444)16.46}} = 0.932$$

$$\theta = 21°$$

The present invention, therefore, is well adapted to carry out the objects and attain the ends and advantages mentioned as well as others inherent therein. While the presently illustrative embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. The method of measuring the contact angle between a liquid and the flat surface of a body of solid material, including the steps of:
   maintaining said flat surface in level position and lowering a measuring instrument into contact with the surface to establish a plane of reference,
   depositing a coherent globule of the liquid onto the flat surface,
   and then alternately lowering the measuring instrument into contact with the top of the globule and adding more of the liquid to the globule until a maximum globule height is established above said reference plane.

2. The method according to claim 1 wherein said body is a compacted mass of particulate solid material.

3. The method according to claim 2 wherein the contact angle is determined according to the following:

$$\cos\theta = 1 - h\sqrt{\frac{2}{3B(1-\epsilon)}}$$

when $\theta$ is less than 90°; and $$\cos\theta = -1 + \sqrt{\frac{4-2h^2B}{3(1-\epsilon)}}$$

when $\theta$ is greater than 90°; where:

$\epsilon$ is the porosity of the compacted mass,
$B = \rho g/2\gamma$, where $\rho$ is the liquid density; $g$ is the acceleration due to gravity; and $\gamma$ is the free surface energy of the liquid, and $h$ is the maximum height of the liquid globule.

4. The method according to claim 1 wherein the contact angle is determined according to the following:

$$\cos\theta = 1 - h\sqrt{\frac{2}{3B}}$$

where $\theta$ is less than 90°; and $$\cos\theta = -1 + \sqrt{\frac{4-2h^2B}{3}}$$

where $\theta$ is greater than 90°, where:

$B = \rho g/2\gamma$, where $\rho$ is the liquid density; $g$ is the acceleration due to gravity; and $\gamma$ is the free surface energy of the liquid, and $h$ is the maximum height of the liquid globule.

5. Apparatus for measuring the contact angle between a liquid and a body of solid material, which comprises:
   a base plate having a flat surface for supporting said body,
   a measuring instrument having a spindle for movement toward and away from said base plate and the body thereon,
   and an upstanding spacer supported on said base plate and having a portion supporting said measuring instrument in fixed relation above said flat surface of the base plate, said spacer having an opening for allowing the deposition of a liquid globule upon said body beneath said spindle of the measuring instrument,
   said apparatus including a cylindrical plunger guide and a plunger slidable therein for compacting a mass of particulate said material on said flat surface of the base plate.

6. Apparatus according to claim 5 including a syringe for depositing the liquid.

7. Apparatus according to claim 6 wherein said base plate is provided with an upstanding threaded annulus for removably receiving said spacer and said plunger guide.

8. Apparatus according to claim 7 wherein said spacer includes an upstanding cylindrical wall of transparent material, said opening being situated in said wall above said annulus on the base plate.

9. Apparatus according to claim 5 wherein said plunger is provided with a projecting ring on its end face for providing an annular depression in the compacted material to anchor the liquid globule.

10. Apparatus according to claim 5 including a syringe for depositing the liquid.

11. Apparatus according to claim 10 wherein said base plate is provided with an upstanding threaded annulus for removably receiving said spacer.

12. Apparatus according to claim 11 wherein said spacer includes an upstanding cylindrical wall of transparent material, said opening being situated in said wall above said annulus on the base plate.

13. Apparatus for measuring the contact angle between a liquid and a body of solid material, which comprises:
a base plate having a flat surface for supporting said body,
a measuring instrument having a spindle for movement toward and away from said base plate and the body thereon,
and an upstanding spacer supported on said base plate and having a portion supporting said measuring instrument in fixed relation above the flat surface of the base plate, said spacer comprising a top plate and a continuous vertical wall which with the base plate forms a chamber adapted to enclose said body, said vertical wall having an opening to admit an instrument for depositing a liquid globule on said body, the opening being of substantially the same size as the portion of the instrument to be inserted therein, and the chamber being completely closed except for said opening.

References Cited

UNITED STATES PATENTS 2,504,212    4/1950    Mennesson ---------- 33—164

FOREIGN PATENTS 1,339,912    9/1963    France.

LOUIS R. PRINCE, Primary Examiner

J. W. ROSKOS, Assistant Examiner

U.S. Cl. X.R.

33—169